No. 668,184. Patented Feb. 19, 1901.
G. S. HILL & W. SCHRAMM.
TRIMMER FOR SEWING MACHINES.
(Application filed Apr. 10, 1900.)
(No Model.) 3 Sheets—Sheet 1.
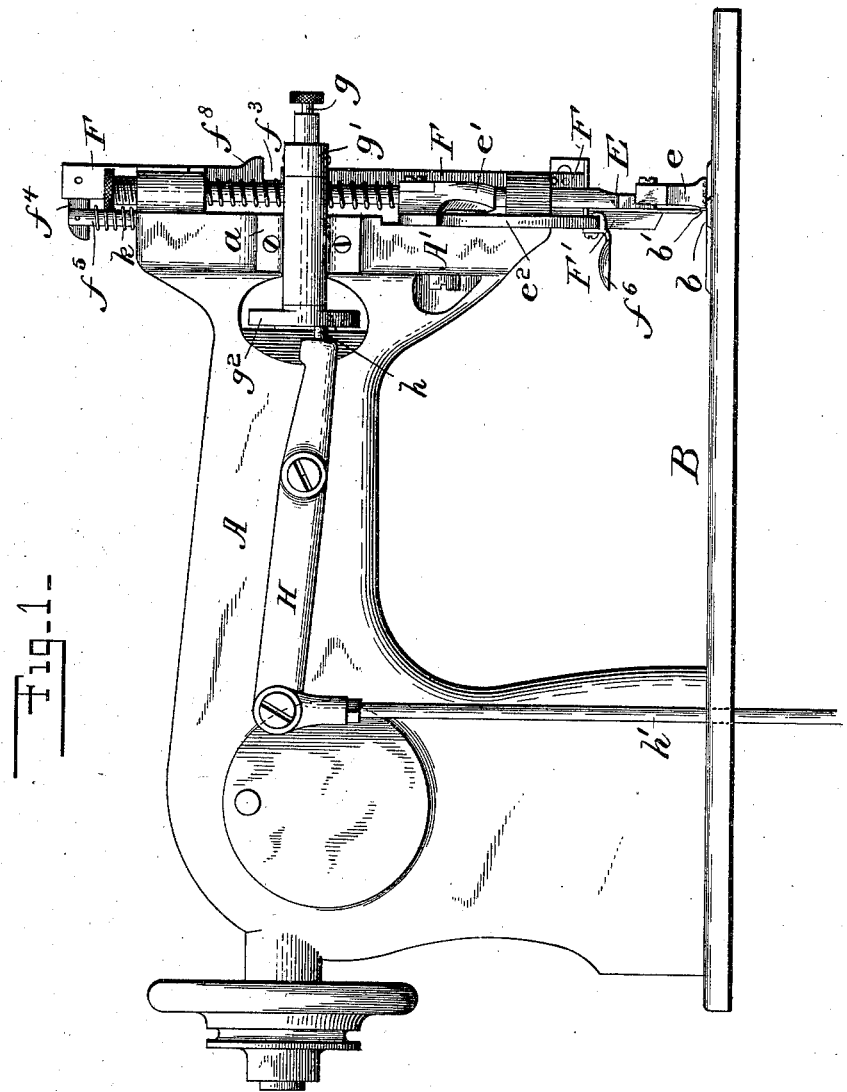
WITNESSES:
F. N. Roehrich.
H. J. Miller.
INVENTORS:
George S. Hill &
William Schramm,
BY
Henry Calver
ATTORNEY

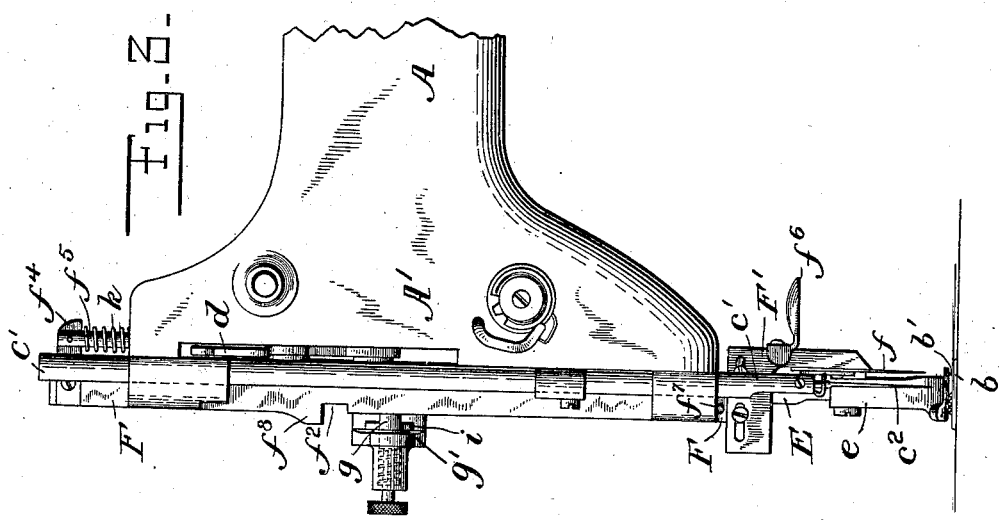
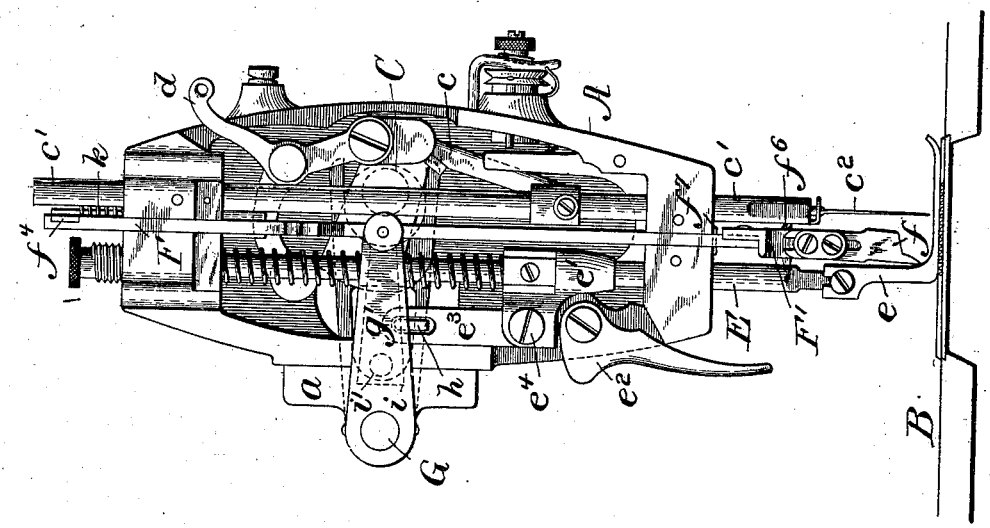

No. 688,184. Patented Feb. 19, 1901.
G. S. HILL & W. SCHRAMM.
TRIMMER FOR SEWING MACHINES.
(Application filed Apr. 10, 1900.)
(No Model.) 3 Sheets—Sheet 3.
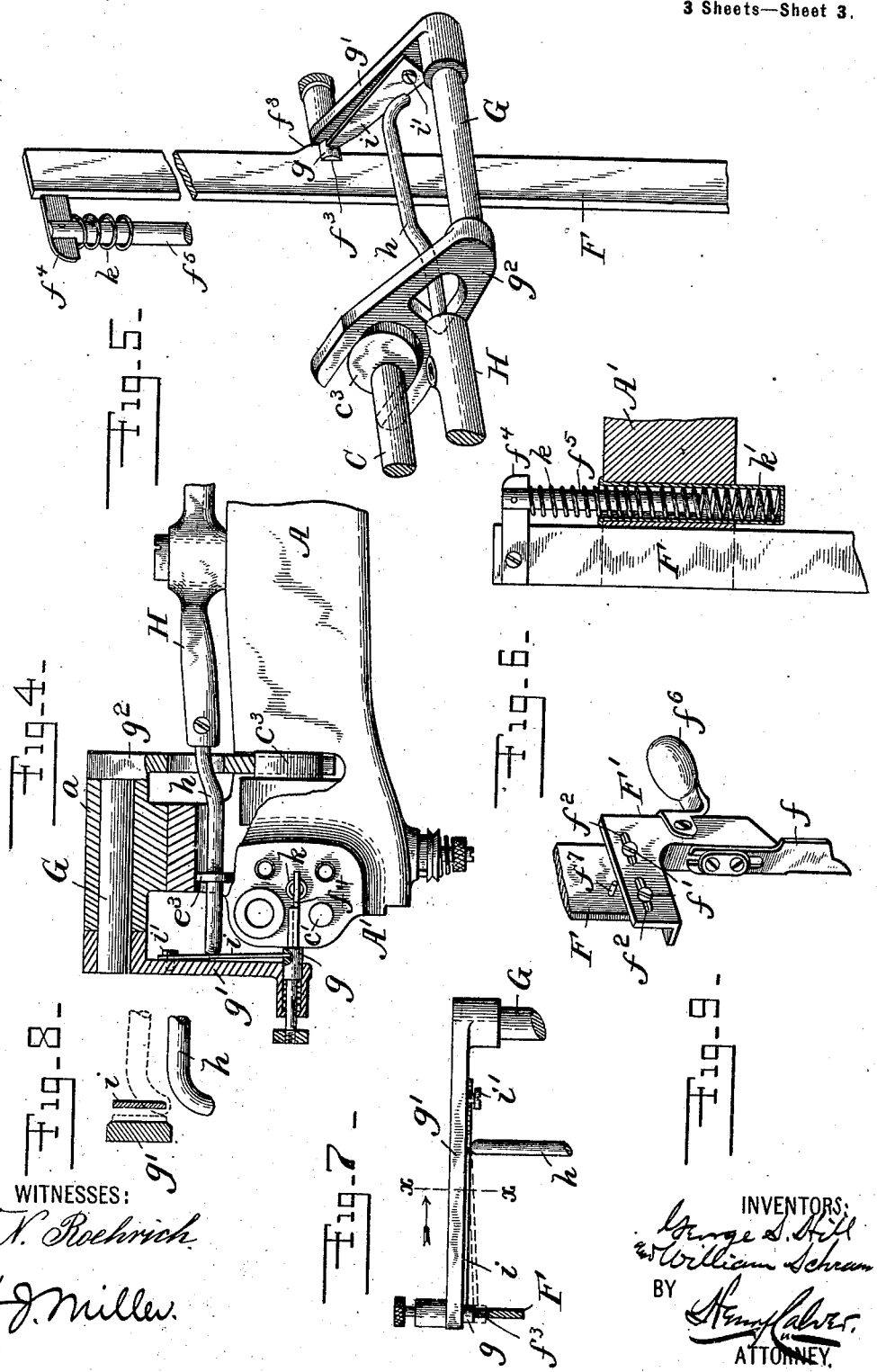
WITNESSES:
F. N. Roehrich
H. J. Miller
INVENTORS:
George S. Hill
William Schramm
BY
Henry Calver
ATTORNEY

UNITED STATES PATENT OFFICE.

GEORGE S. HILL, OF HAVERHILL, MASSACHUSETTS, AND WILLIAM SCHRAMM, OF ELIZABETH, NEW JERSEY, ASSIGNORS TO THE SINGER MANUFACTURING COMPANY, OF NEW JERSEY.

TRIMMER FOR SEWING-MACHINES.

SPECIFICATION forming part of Letters Patent No. 668,184, dated February 19, 1901.

Application filed April 10, 1900. Serial No. 12,276. (No model.)

*To all whom it may concern:*

Be it known that we, GEORGE S. HILL, residing at Haverhill, in the county of Essex and State of Massachusetts, and WILLIAM SCHRAMM, residing at Elizabeth, in the county of Union and State of New Jersey, citizens of the United States, have invented certain new and useful Improvements in Sewing-Machine Trimmers, of which the following is a specification, reference being had therein to the accompanying drawings.

This invention relates to that class of sewing-machine trimmers in which the trimming blade or knife is carried by a vertically-reciprocating bar mounted in the head of the machine; and the invention has for its object to provide convenient means for throwing the trimming device into and out of operation either when the machine is running or when it is at rest, the means for throwing the trimmer out of operation being preferably a part of or connected with a presser-foot-lifting device operated from beneath the work-plate by a treadle or knee-lifter, so that the trimming operation can be suspended without requiring the use of the attendant's hands.

In the accompanying drawings, Figure 1 is a rear side elevation of the upper portion of a well-known form of Singer sewing-machine embodying the invention. Fig. 2 is a front end view of the same with the face-plate removed, and Fig. 3 is a front side view of the head. Fig. 4 is a detail plan view, partly in horizontal section. Fig. 5 is a detail perspective view of the trimmer-bar, its operating mechanism, and uncoupling device. Fig. 6 is a detail view of the upper part of the trimmer-bar and means for lifting said bar to its inoperative position when uncoupled. Figs. 7 and 8 are detail views illustrating the operation of uncoupling the trimmer-bar from its operating-arm, and Fig. 9 is a detail perspective view of the lower part of the trimmer-bar.

In the machine shown in the accompanying drawings the arm A, with its head A', the work-plate B, the rotating driving-shaft C, having at its forward end a crank connected by a pitman $c$ with the reciprocating needle-bar $c'$, carrying the usual eye-pointed needle $c^2$, the take-up lever $d$, the presser-bar E, and the presser-foot $e$ are or may be of any well-known or usual construction.

F is the vertically-reciprocating trimmer-bar, mounted in the head A' and provided at its lower end with the trimming blade or knife $f$, which is preferably attached to a laterally-adjustable bracket F', fixed to said bar by means of screws $f'$, passing through slots $f^2$ in the shank of said bracket, said blade or knife being vertically adjustable on said bracket to compensate for wear. The trimmer-bar F is provided with a notch $f^3$ to receive a spring-pressed coupling-pin $g$, mounted in the end of an arm $g'$ of a rock-shaft G, journaled in a bearing block or portion $a$ of the head A', said shaft having rearward of said head a second arm $g^2$, forked to embrace an eccentric $c^3$ on the driving-shaft C, and which eccentric serves to oscillate said rock-shaft to reciprocate the trimmer-bar F vertically. The throat-plate $b$ is preferably provided with a raised rib $b'$, located contiguous to the path of movement of the blade or knife $f$ and coöperating therewith in the cutting operation in that said rib supports the work against the thrust of the said blade or knife.

The presser-bar E is provided with a block $e'$, arranged to be engaged by the lifting cam-lever $e^2$, said block having an upwardly-extending slotted arm or bar $e^3$, herein shown as being attached to said block by a screw $e^4$, and through which slotted arm or bar extends a rod $h$, attached to or forming part of a lifting-lever H, pivoted to the arm A and having attached to its rear end a rod $h'$, extending down through the work-plate to a treadle or knee-lever (not shown) of any ordinary or well-known construction, so that the said lever H may be operated without requiring the use of the attendant's hands, and thus the free manipulation of the work by the attendant will not be interfered with.

Mounted on the rear or inner side of the arm $g'$ of the rock-shaft G is a small lever $i$, loosely supported at one end on a screw $i'$ and engaging at its free or forward end the spring-pressed coupling-pin $g$. The forward end of the rod $h$, forming part of the lever H, extends beneath the lever $i$ and is preferably constructed with a downturned or rounded end portion arranged to come in contact with said lever $i$ when the forward end of the said lever H is lifted by depressing its rear end by means of the rod $h'$, such upward movement of the forward end of the said lever H moving the free end of the lever $i$ toward the arm $g'$ to the position denoted in full lines in Fig. 7, thus forcing the spring-pressed coupling-pin $g$ outward to disengage it from its notch $f^3$ in the trimmer-bar F. When the said coupling-pin $g$ has thus been disengaged from the trimmer-bar F, said bar is immediately lifted to an inoperative position (with the notch $f^3$ out of the range of movement of the pin $g$, traveling with the vibrating arm $g'$) by a coil-spring $k$, arranged beneath an arm or lug $f^4$ at the upper part of the said bar F and partly housed in a tube or socket in the head A', said spring in the present instance surrounding a pin $f^5$, preferably attached to said arm or lug. The upward movement of the bar F by the spring $k$ is limited by a stop-pin $f^7$ on said bar and arranged to come in contact with the lower end of the head A'.

From the foregoing it will be understood that the trimmer may be thrown out of operation, either when the machine is running or at rest, simply by depressing the rear end of the lever H by means of the rod $h'$ or otherwise, this uncoupling operation of the trimmer-bar F from its operating mechanism also preferably lifting the presser-bar and presser-foot, although the trimmer-bar may be thrown out of operation without lifting the presser simply by making the slot in the bar or arm $e^3$ of sufficient length to permit of a certain amount of lost motion between the rod $h$ and said bar or arm, so that the lever $i$ will be operated to disengage the coupling-pin $g$ from the bar F before the upward movement of the rod $h$ has been sufficient to lift the presser-bar.

The trimmer-bar F is provided near its lower end, and thus conveniently accessible to the attendant, with a finger-piece $f^6$, which may be pressed upon when it is desired to lower said bar into operative position against the stress of its lifting and holding spring $k$, the downward movement of said bar when the notch $f^3$ registers with the coupling-pin $g$ being limited by a stop projection or nose $f^8$ on said bar above said notch.

The invention is not to be understood as limited to the particular form of lifting-lever for the presser-bar herein shown and described, as the trimmer-bar-coupling device might be disconnected when the presser-foot is raised by means of any suitable hand-lever.

Having thus described our invention, we claim and desire to secure by Letters Patent—

1. In a sewing-machine, the combination with a blade-carrying trimmer-bar and a coöperating cutting device, of mechanism for operating said trimmer-bar, a coupling device for operatively connecting said bar with its operating mechanism, a presser-bar provided with a presser-foot, and a presser-foot-lifting device constructed and arranged to act on said coupling device, so that when the presser-foot is lifted the said coupling device will also be acted on to disconnect said trimmer-bar from its operating mechanism.

2. In a sewing-machine, the combination with a presser-bar and its foot, and a lever for lifting the same, of a blade-carrying trimmer-bar, a part coöperating with the blade of said bar in cutting, operating mechanism for said trimmer-bar, and a coupling device for connecting said trimmer-bar with its operating mechanism and which coupling device is arranged to be operated by said lifting-lever to disengage said trimmer-bar from its operating mechanism when the presser-foot is lifted.

3. In a sewing-machine, the combination with a blade-carrying trimmer-bar and a stationary part coöperating with the blade of said bar, of operating mechanism for said trimmer-bar, a foot-carrying presser-bar, means for lifting the presser-bar and its foot, and means, operated by the presser-lifting device, for disconnecting said trimmer-bar from its operating mechanism simultaneously with the lifting of the presser-foot.

4. In a sewing-machine, the combination with a blade-carrying trimmer-bar and a stationary part coöperating with the blade of said bar, of a rock-shaft having an arm provided with a spring-pressed coupling-pin engaging said trimmer-bar, a presser bar and foot, and a lever for lifting said bar and foot and for disengaging said coupling-pin from said trimmer-bar.

5. In a sewing-machine trimmer, the combination with the notched blade-carrying trimmer-bar F and a stationary part coöperating with the blade of said bar, of the rock-shaft G having the arm $g'$ carrying the spring-pressed coupling-pin $g$, and having also the forked arm $g^2$, the driving-shaft C provided with an eccentric embraced by said forked arm $g^2$, a presser bar and foot, a lifter for said bar, and means, operated by said lifter, for disconnecting said coupling-pin from said trimmer-bar and a spring for lifting said bar when disconnected from its operating device.

6. In a sewing-machine trimmer, the combination with the notched blade-carrying trimmer-bar F and a stationary part coöperating with the blade of said bar, of the rock-shaft G having the arm $g'$ carrying the spring-pressed coupling-pin $g$ to engage the notch of said bar, said shaft having also the forked arm $g^2$, the driving-shaft C provided with an eccentric embraced by said forked arm, the lever $i$ mounted in the said arm $g$ and engaging said coupling-pin at its free end, and the lever H having a part adapted to engage said lever $i$.

7. In a sewing-machine, the combination with the blade-carrying trimmer-bar F and a stationary part coöperating with the blade of said bar, of the rock-shaft G having the arm $g'$ carrying the spring-pressed coupling-pin $g$ and the lever $i$ engaging said pin, means for operating said rock-shaft, a presser bar and foot, and the lever H having a part serving to lift said bar and foot and also to operate said lever $i$ to cause said coupling-pin to be disconnected from said trimmer-bar.

In testimony whereof we affix our signatures in the presence of witnesses.

GEORGE S. HILL.
WILLIAM SCHRAMM.

Witnesses for George S. Hill:
H. L. ROBBINS,
R. M. PIERSON.

Witnesses for William Schramm:
HENRY J. MILLER,
E. DE F. HILLER.